Dec. 17, 1968  F. C. HITZEROTH  3,416,431
NEGATOR SPRING TOASTER
Filed March 30, 1967
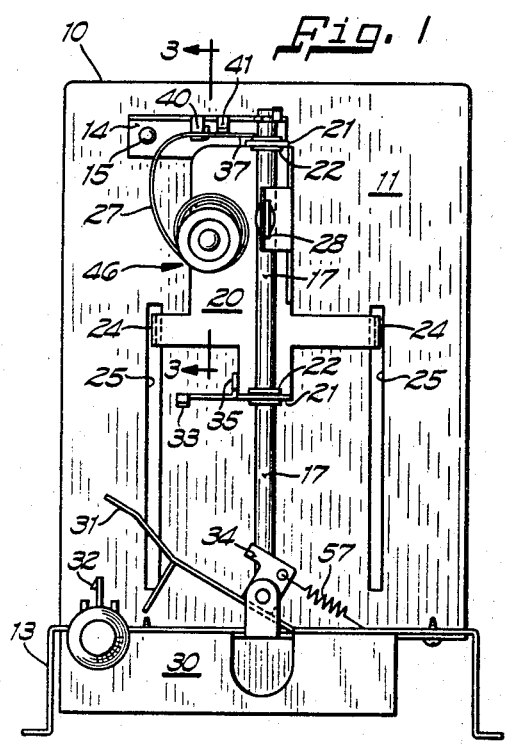
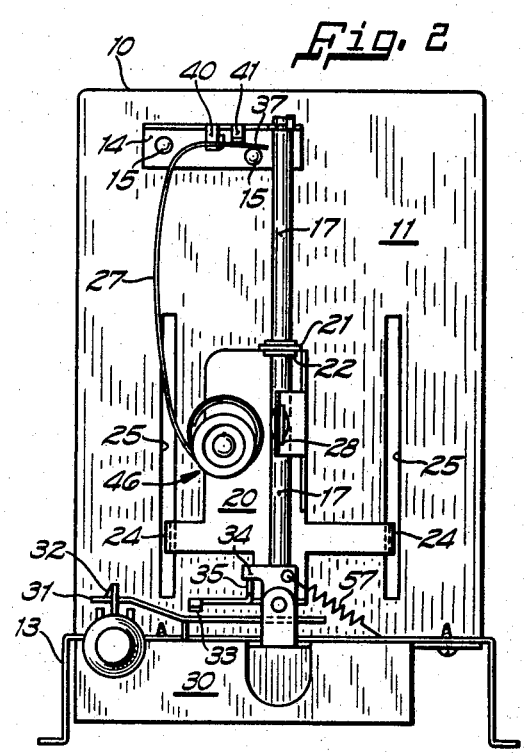
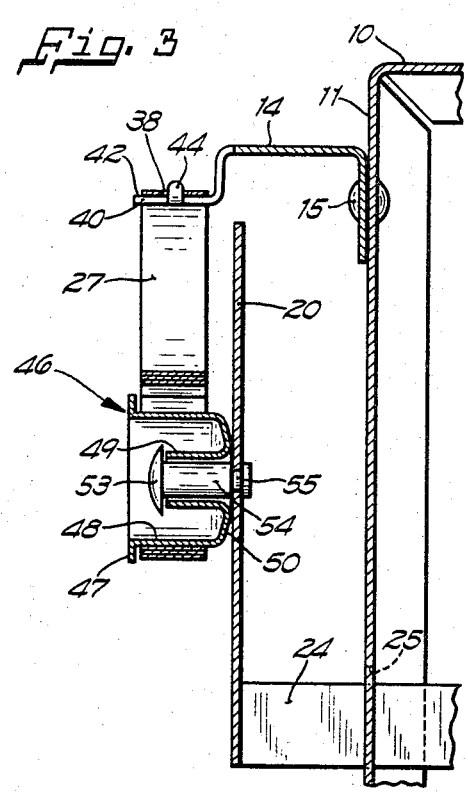
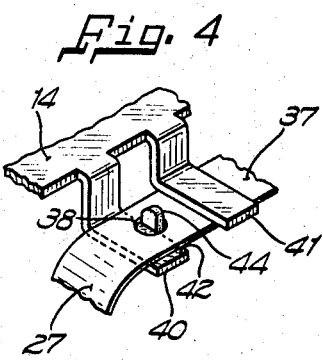
Inventor.
Franklin C. Hitzeroth
By Robert W. Latimer
Attorney United States Patent Office 3,416,431
Patented Dec. 17, 1968

3,416,431
NEGATOR SPRING TOASTER
Franklin C. Hitzeroth, Centerville, Iowa, assignor to McGraw-Edison Company, Milwaukee, Wis., a corporation of Delaware
Filed Mar. 30, 1967, Ser. No. 626,996
9 Claims. (Cl. 99—391)

ABSTRACT OF THE DISCLOSURE

Apparatus for returning a toaster carriage to a raised loading position utilizing a zero gradient spring which provides both biasing means and shock absorbing termination of upward carriage travel. The coiled end of this spring is carried about a spool or drum having a minimal resistance to rotation.

Automatic toasters of the most numerous design utilize a bread slice carriage movable between an upper loading position and a lowered toasting position which is actuable to initiate the toasting cycle by manual lowering of the carriage or is bread actuated by insertion of a bread slice with a power unit provided to lower the carriage. In the lowered position the carriage is retained against the upward biasing force which urges the carriage toward the upper position, by a timer or sensing device that determines the toasting cycle and releases the carriage at the termination thereof.

The normal spring biasing means must not only move the carriage from the lowered to the raised position, but must also in the relaxed condition retain the carriage in the raised position. In the normal application, the spring constant causes an increased force to be exerted at the extended position when the carriage is lowered causing an unnecessarily large upward biasing force.

In the structure of the present invention a closely coiled spring of strip material in the form of a substantially zero gradient spring affords the upward biasing force. Accordingly the same upward force maintains the carriage in the raised position as is exerted upwardly when the carriage is in the lowered position. In addition by cantilevering the outer end of the spring into the path of upward travel of the carriage the shock absorbing function is achieved at the upper end of carriage travel, thus affording this function with fewer parts, simplified assembly and an inherently longer life structure.

It is an object of this invention to provide an improved toaster structure;

It is a further object of this invention to provide a toaster carriage return with a substantially uniform upward biasing force in both the raised and lowered positions;

It is a further object of this invention to provide a toaster wherein the carriage biasing means also serves as a shock absorbing device;

It is also an object of this invention to provide a spring supporting structure that minimizes the friction between the spring and the supporting structure on which it is carried.

These and other objects and advantages of this invention will become apparent from the following description when taken in connection with the accompanying drawings, wherein:

FIG. 1 is an end view of a toaster with the outer case removed and the carriage in the upper, raised position;

FIG. 2 is an end view of the toaster of FIG. 1 with the carriage in the lowered position;

FIG. 3 is a section view taken along line 3—3 of FIG. 1; and

FIG. 4 is a fragmentary isometric view showing the mounting of the spring outer end portion on the toaster oven.

Referring to FIGS. 1 and 2, a toaster oven 10 including an end wall 11 is mounted on a main frame 13. A bracket 14 is secured to the oven end wall 11 by a pair of rivets 15. A vertical carriage shaft 17 is secured at its upper end to the bracket 14 and at its lower end to the main frame 13. A carriage 20 has a pair of apertured horizontal flange portions 21 with grommets 22 carried in the apertures and journaled about the vertical carriage shaft 17. A pair of bread slice carriers 24, forming a part of the carriage 20, project into the toaster oven through the vertical slotted apertures 25 in the end wall. Guided by the vertical carriage shaft 17 and the apertures 25 the carriage 20 is freely movable upwardly and downwardly along a vertical path.

Also mounted on the main frame 13 is a timer assembly 30 which includes a control lever 31 and an escapement lever 32. The timer mechanism is of the type more completely shown in U.S. Patent 3,175,482 assigned to the same assignee which, since it forms no part of the present invention, will not be described in detail herein.

The carriage is normally biased upwardly by a spring 27 toward the upper or loading position illustrated in FIG. 1 and may be moved manually by depressing a handle (not shown) which is normally carried by an arm 28 mounted on the carriage. When the carriage is depressed, a flange portion 33 engages and pivots the control lever 31 in a counterclockwise direction as viewed in FIGS. 1 and 2 to a position where it is retained by the escapement lever 32. The carriage when thereafter released, is retained in a lowered toasting position by a control lever latch portion 34 which engages the carriage projection 35 for the duration of the toasting cycle.

The spring 27 is formed of a strip of metal and has an inner end formed into a closely wound helix in a common plane with adjoining convolutions in tight engagement upon one another. The outer terminal end 37 is substantially straight with an aperture 38 therein to facilitate mounting on the toaster oven. The bracket 14 has two horizontally spaced vertically staggered generally parallel horizontal projections 40, 41. As best seen in FIG. 4, the spring passes between projections 40 and 41 engaging the upper surface 42 of projection 40 and the lower surface of the projection 41 with an upwardly extending tab 44 formed as a flanged portion of projection 40 extending through the spring aperture 38 to retain the outer end of the spring. The outer terminal portion projects toward the rod 17 and is disposed in the path of upward travel of carriage 20 and particularly in the path of the upper grommet 22.

The coiled portion of spring 27 is carried about a drum or spool 46 (FIG. 3) which has a flange 47 and a cylindrical spring retaining portion 48 which is connected to a spindle engaging cylindrical portion 49 by a generally radial convex annular wall 50 which has a maximum axial projection at a location closely adjacent the mounting spindle 53. The drum 46 is secured to the carriage 20 by the spindle 53 about which the drum is free to rotate. Spindle 53 has an increased diameter shank portion 54 about which the drum is journaled and a reduced diameter end 55 which extends through an aperture in the carriage and is upset to effect retention thereof as a part of the carriage assembly. Providing line contact between the drum radial wall 50 and the carriage wall closely adjacent the spindle minimizes frictional resistance to the rotation of the drum.

Spring 27 is urged toward a normally coiled position providing an upward biasing force to the carriage 20 having a substantially zero gradient and consequently affords a substantially constant upward force to the carriage at any position of spring extension.

In operation the carriage 20 is moved down extending the retaining spring 27 by a constant force to the condition shown in FIG. 2 where the carriage is retained throughout the toasting cycle by the timer assembly 30. At the termination of the toasting cycle the control lever 31 is released permitting it to be pivoted in a clock-wise direction as seen in FIGS. 1 and 2 by the spring 57, releasing the carriage projection 35 from the control lever latch 34. Thereafter the spring 27 coils upon itself urging the carriage upward. As the carriage approaches the upper limit of vertical travel the energy of the upwardly moving carriage is absorbed by engagement between the carriage and the outer spring generally straight end portion 37 which is restrained by contact with the projection 41. Accordingly the spring provides not only the upward biasing function to lift the carriage to an upper loading position, but also serves as a shock absorber in eliminating the necessity of providing an independent shock absorbing mechanism.

Although but one embodiment has been shown and described, it will be apparent to those skilled in the art that various changes and modifications may be made therein without departing from the spirit of the invention or from the scope of the appendant claims.

What is claimed is:

1. A toaster comprising an oven; a carriage vertically movable with respect to said oven between a first raised position and a second lowered position; a substantially zero gradient biasing spring urging said carriage toward said first position, said biasing spring having a coiled portion including a plurality of convolutions in a substantially common radial plane and an outer end with said spring having one portion engaging said oven and another portion engaging said carriage, the coiled portion of the spring being carried by said carriage and the outer end of the spring being attached to said oven.

2. The toaster of claim 1 wherein a pair of projections are mounted on and extend from said oven and said outer end of said spring extends between said projections and engages one of said projections to prevent longitudinal movement of said outer end with respect to said projections.

3. The toaster of claim 2 wherein said outer end portion of said spring is apertured and one of said projections has a flanged portion extending into said aperture.

4. The toaster of claim 2 wherein said spring outer end is cantilevered beyond said projections and is positioned in the path of upward travel of a part of said carriage to engage said carriage and yieldingly limit the upward travel of said carriage.

5. The toaster of claim 4 further comprising a drum rotatably mounted on said carriage about a horizontal axis with said coiled portion of said spring surrounding and retained by said drum.

6. The toaster of claim 5 wherein said drum has a flanged rim and a convex annular generally radial wall extending from the pivot to the rim at the axial end adjoining the carriage with the maximum axial projection adjacent the axis of said drum whereby minimal frictional contact occurs between the axial end of said drum and said carriage.

7. The toaster of claim 1 further comprising a drum rotatably mounted on said carriage about a horizontal axis with said coiled portion of said spring surrounding and retained by said drum.

8. The toaster of claim 7 wherein said drum has a flanged rim and a convex annular generally radial wall extending from the pivot to the rim at the axial end adjoining the carriage with the maximum axial projection adjacent the axis of said drum whereby a minimal frictional contact occurs between the axial end of said drum and said carriage.

9. A toaster comprising oven and carriage elements; said carriage element being vertically movable with respect to said oven element between a first raised position and a second lowered position; a substantially zero gradient biasing spring urging said carriage element toward said first position, said biasing spring having a coiled portion including a plurality of convolutions in a substantiallly common radial plane and an outer end; a post mounted on one of the elements, the coiled portion of the spring being received on and rotatable relative to the post as the carriage is moved between the raised and lowered positions and the outer end of the spring being connected to the other of the elements.

References Cited
UNITED STATES PATENTS 2,750,873  6/1956  Sivacek _____ 99—329

BILLY J. WILHITE, *Primary Examiner.*

U.S. Cl. X.R.

267—1